United States Patent [19]

Hara et al.

[11] Patent Number: 4,831,579
[45] Date of Patent: * May 16, 1989

[54] FULL ADDER CIRCUIT HAVING AN EXCLUSIVE-OR CIRCUIT

[75] Inventors: Hiroyuki Hara, Tokyo; Yasuhiro Sugimoto, Yokohama, both of Japan

[73] Assignee: Kabushiki Kaisha Toshiba, Kawasaki, Japan

[*] Notice: The portion of the term of this patent subsequent to Jan. 5, 2005 has been disclaimed.

[21] Appl. No.: 734,142

[22] Filed: May 15, 1985

[30] Foreign Application Priority Data

May 24, 1984 [JP] Japan .................................. 59/105117

[51] Int. Cl.[4] .......................... G06F 7/50; H03K 19/21
[52] U.S. Cl. ...................................... 364/784; 307/471
[58] Field of Search ................ 307/471, 472; 364/768, 364/784–788

[56] References Cited

U.S. PATENT DOCUMENTS

| | | | |
|---|---|---|---|
| 3,519,810 | 7/1970 | Priel et al | 364/784 |
| 3,590,230 | 6/1971 | Nordquist | 364/784 |
| 3,612,847 | 10/1971 | Jörgensen | 364/786 |
| 4,215,418 | 7/1980 | Muramatsu | 364/784 |
| 4,408,134 | 10/1983 | Allen | 307/471 |
| 4,547,863 | 10/1985 | Colardelle | 364/788 |
| 4,564,921 | 1/1986 | Suganuma | 364/784 |
| 4,605,871 | 8/1986 | Price et al. | 307/471 |
| 4,621,338 | 11/1986 | Uhlenhoff | 364/786 |
| 4,633,104 | 12/1986 | Mallinson | 307/471 |
| 4,660,165 | 4/1987 | Masumoto | 364/787 |
| 4,718,035 | 1/1988 | Hara et al. | 364/784 |
| 4,740,907 | 4/1988 | Shimizu et al. | 364/784 |

FOREIGN PATENT DOCUMENTS

4532972 10/1973 Japan .
58-211252 12/1983 Japan .

OTHER PUBLICATIONS

Application of Digital Signal Processing; the Institute of Electronics and Communications Engineers of Japan.

Primary Examiner—Gary V. Harkcom
Assistant Examiner—Dale M. Shaw
Attorney, Agent, or Firm—Finnegan, Henderson, Farabow, Garrett, & Dunner

[57] ABSTRACT

A logic operation circuit includes an exclusive-OR circuit for receiving first and second logic sum signals of preceeding stages, a sum signal selection circuit for selectively generating a carry output signal or an inverted signal thereof as a carry output signal in accordance with an output signal from the exclusive-OR circuit, and a carry output signal selection circuit for selectively generating the carry input signal or the first logic sum signal as a sum signal in accordance with the output signal from the exclusive-OR circuit. The exclusive-OR circuit includes a double balance type differential amplifier connected between first and second power source terminals, and the sum signal selection circuit includes a double balance differential amplifier operated in accordance with the output signal from the exclusive-OR circuit and the carry input signal and connected between the first and second power source terminals.

5 Claims, 4 Drawing Sheets

FULL ADDER CIRCUIT HAVING AN EXCLUSIVE-OR CIRCUIT

BACKGROUND OF THE INVENTION

The present invention relates to a logic operation circuit having a sum output terminal and a carry output terminal.

Conventionally, as shown in FIG. 1, a full adder circuit which generates sum signals S and $\overline{S}$ and carry output signals CO and $\overline{CO}$ in response to logic input signals A and B and carry input signals C and $\overline{C}$ is known. The full adder circuit comprises transistors TR1 and TR2 having bases respectively connected to input terminals IT1 and IT2 for receiving the input signals A and B and collectors connected to a power source terminal VCC; transistors TR3 to TR8 having bases commonly connected to an input terminal IT3 for receiving the carry input signal C; and transistors TR9 to TR14 having bases commonly connected to an input terminal IT4 for receiving the carry input signal $\overline{C}$. The collectors of the transistors TR3, TR6, TR10 and TR11 are commonly connected to the base of a transistor TR15 and are also commonly connected to the terminal VCC through a resistor R1. The collectors of the transistors TR4, TR5, TR9 and TR1 are commonly connected to the base of a transistor TR16 and are also commonly connected to the terminal VCC through a resistor R2. The collectors of the transistors TR7 and TR8 are commonly connected to the base of a transistor TR17 and are also connected to the terminal VCC through a resistor R3. The collectors of the transistors TR13 and TR14 are commonly connected to the base of a transistor TR18 and are also commonly connected to the terminal VCC through a resistor R4.

The collectors of the transistors TR15 to TR18 are commonly connected to the terminal VCC, and the emitters thereof are each commonly connected to a power source terminal VEE through resistors.

Furthermore, the full adder circuit comprises transistors TR19 to TR22 having bases commonly connected to the emitter of the transistor TR1; transistors TR23 to TR26 having bases commonly connected to a reference voltage terminal VR1; transistors TR27 and TR28 having bases commonly connected to the emitter of the transistor TR2 through a diode D; transistors TR29 and TR30 having bases commonly connected to a reference voltage terminal VR2; and transistors TR31 and TR32 having bases commonly connected to a reference voltage terminal VR3. The collectors of the transistors TR19, TR20, TR22, TR23, TR24 and TR25 are respectively connected to the emitters of the transistors TR3 and TR9, the emitters of the transistors TR5 and TR11, the emitters of the transistors TR8 and TR14, the emitters of the transistors TR4 and TR10, the emitters of the transistors TR6 and TR12, and the emitters of the transistors TR7 and TR13. The collectors of the transistors TR21 and TR26 are connected to the terminal VCC respectively through the resistors R3 and R4. The collectors of the transistors TR27 to TR32 are respectively connected to the emitters of the transistors TR19 and TR23, the emitters of the transistors TR21 and TR25, the emitters of the transistors TR20 and TR24, the emitters of the transistors TR22 and TR26, the emitters of the transistors TR27 and TR29, and the emitters of the transistors TR28 and TR30.

In the full adder circuit, the sum signal S and its inverted signal $\overline{S}$ thereof and the carry output signal CO and its inverted signal $\overline{CO}$ are generated from the emitters of the transistors TR16, TR15, TR18 and TR17 in accordance with the input signals A, B, C and $\overline{C}$, respectively. Assume that the input signals A and B are at "1" level, and the carry input signals C and $\overline{C}$ are "0" and "1" levels. In this case, a current flows through the transistors TR9, TR19, TR27 and TR31, thereby rendering the transistors TR15 and TR16 conductive and nonconductive, respectively. Therefore, the "0" level sum signal S can be derived from the emitter of the transistor TR16. On the other hand, since the input signals A and B and the carry input signal $\overline{C}$ are "1" level, a current flows through the transistors TR21, TR28 and TR32, thus rendering the transistors TR18 and TR17 conductive and nonconductive, respectively. Therefore, the "1" level carry output signal CO can be derived from the emitter of the transistor TR18.

In the conventional full adder circuit, a circuit section for generating the sum signal and that for generating the carry signal are formed independently of each other. For this reason, the number of transistors required for constituting the full adder circuit is increased, and it is difficult to constitute an integrated circuit. Furthermore, in the conventional full adder circuit, since current paths of a number of transistors are connected in series between the terminals VCC and VEE, it is difficult to determine levels of input and reference voltages. In addition, this circuit cannot be driven at a low voltage.

A conventional full adder circuit comprising CMOS transistors having a first exclusive-OR circuit for receiving logic input signals A and B; a second exclusive-OR circuit for receiving an output signal from the first exclusive-OR circuit and a carry input signal C so as to generate a sum signal SO; and a selection circuit for selecting the input signal B or the carry signal C in accordance with the output signal from the first exclusive-OR circuit so as to generate the selected signal as a carry output signal CO has been proposed. The configuration of the full adder circuit is based on a relationship among the input signals A and B, the carry input signal C, an exclusive-OR value of the signals A and B, the sum signal SO and the carry output signal CO. Unlike a conventional full adder circuit comprising CMOS transistors, the number of elements is decreased, and the circuit is suited for integration. However, in this full adder circuit, since a number of MOS transistors are used, the operating speed is low

SUMMARY OF THE INVENTION

It is an object of the present invention to provide a logic operation circuit having a simple structure and suited for integration.

In order to achieve the above object, there is provided a logic operation circuit comprising an exclusive-OR circuit, including a double balance type differential amplifier circuit connected between first and second power source terminals receiving first and second input signals, for generating an output signal in accordance with an exclusive-OR value of the first and second input signals; a sum signal selection circuit, including a double balance type differential amplifier which is connected between the first and second power source terminals and includes a lower stage differential amplifier section having first and second current paths selectively activated in accordance with the output signal from the exclusive-OR circuit and an upper stage differential amplifier section having third to sixth current paths selectively activated in accordance with a carry input signal, for generating the carry input signal as a sum signal when the output signal from the exclusive-OR circuit is "0" level, and for generating an inverted carry input signal as the sum signal when the output signal is "1" level; and a carry output signal selection circuit for generating the first input signal as a carry output signal when the output signal from the exclusive-OR circuit is at "0" level and for generating the carry input signal as the carry output signal when the output signal therefrom is at "1" level, the carry output signal selection circuit including a first differential amplifier having seventh and eighth current paths selectively activated in accordance with the output signal from the exclusive-OR circuit, a second differential amplifier having ninth and tenth current paths selectively activated in accordance with the first input signal and connected in series with the seventh current path, and a third differential amplifier having eleventh and twelfth current paths selectively activated in accordance with the carry input signal and connected in series with the eighth current path.

Since the exclusive-OR circuit and the sum selection circuit comprise the double balance type differential amplifiers and the carry output signal selection circuit comprises two-stage differential amplifier circuit, the logic operation circuit of the present invention can be constructed with bipolar transistors having a simple arrangement. Since the number of the transistors having current paths series-connected between the first and second power source terminals can be decreased, the circuit can be driven at a low voltage.

DETAILED DESCRIPTION OF THE PREFERRED EMBODIMENT

Figure 2:
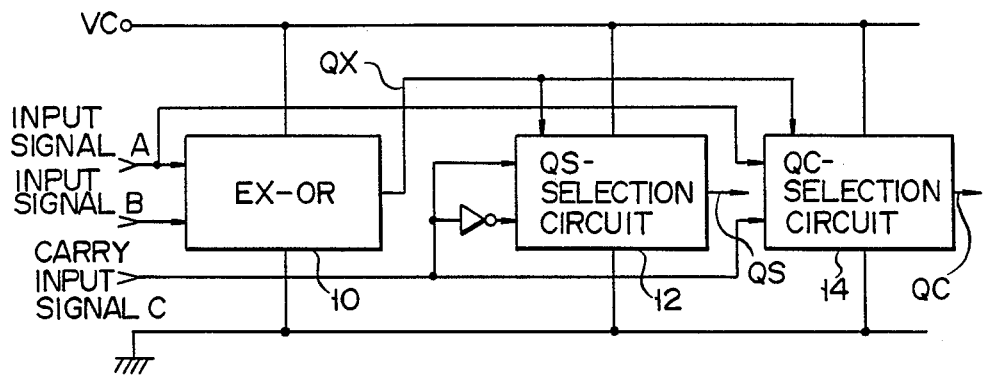
FIG. 2 is a diagram showing a logic operation circuit according to an embodiment of the present invention.

FIG. 2 is a diagram showing a logic operation circuit according to an embodiment of the present invention. The logic operation circuit is constructed by utilizing the relationship among input signals A and B, a carry input signal C, an output signal QX from an exclusive-OR circuit 10 which receives the input signals A and B, a sum output signal QS and a carry output signal QC. This logic operation circuit serves as a full adder circuit in accordance with a truth table shown below.

TABLE

| A | B | C | QS | QC | QX |
|---|---|---|---|---|---|
| 0 | 0 | 0 | 0 (=C) | 0 (=A) | 0 |
| 0 | 0 | 1 | 1 (=C) | 0 (=A) | 0 |
| 1 | 1 | 0 | 0 (=C) | 1 (=A) | 0 |
| 1 | 1 | 1 | 1 (=C) | 1 (=A) | 0 |
| 0 | 1 | 0 | 1 (=C̄) | 0 (=C) | 1 |
| 0 | 1 | 1 | 0 (=C̄) | 1 (=C) | 1 |

TABLE-continued

| A | B | C | QS | QC | QX |
|---|---|---|---|---|---|
| 1 | 0 | 0 | 1 (=C̄) | 0 (=C) | 1 |
| 1 | 0 | 1 | 0 (=C̄) | 1 (=C) | 1 |

As can be seen from this truth table, when the output signal QX of the exclusive-OR circuit 10 is at "0" level, the sum signal QS is equal to the carry input signal C and the carry output signal QC is equal to the input signal A. When the output signal QX of the circuit 10 is at "1" level, the sum signal QS is equal to a signal C̄ which is obtained by inverting the carry input signal C and the carry output signal QC is equal to the carry input signal C.

In the full adder circuit shown in FIG. 2, the output terminal of the circuit 10 is connected to control terminals of a sum signal selection circuit 12 and a carry output signal selection circuit 14. The circuit 12 serves as a switching circuit having a first input terminal which directly receives the carry input signal C and a second input terminal which receives the carry input signal C through an inverter, and having an operation mode or switching position controlled by the output signal QX from the circuit 10. The circuit 12 is set in a first operation mode in response to the "0" output signal QX from the circuit 10 so as to generate the carry input signal C as a sum signal QS. The circuit is set in a second operation mode in response to the "1" output signal QX from the circuit 10 so as to generate as the sum signal QS a signal C̄ obtained by inverting the carry input signal C. The circuit 14 serves as a switching circuit having a first input terminal which receives the input signal A and a second input terminal which receives the carry input signal C, and having an operation mode or switching position controlled by the output signal QX from the circuit 10. The circuit 14 is set in a first operation mode in response to the "0" output signal QX from the circuit 10 so as to generate the input signal A as the carry output signal QC, and is set in a second operation mode in response to the "1" output signal QX from the circuit 10 so as to generate the carry input signal C as the carry output signal QC. These circuits 10, 12 and 14 are driven by a power supply voltage VC.

Figure 3:
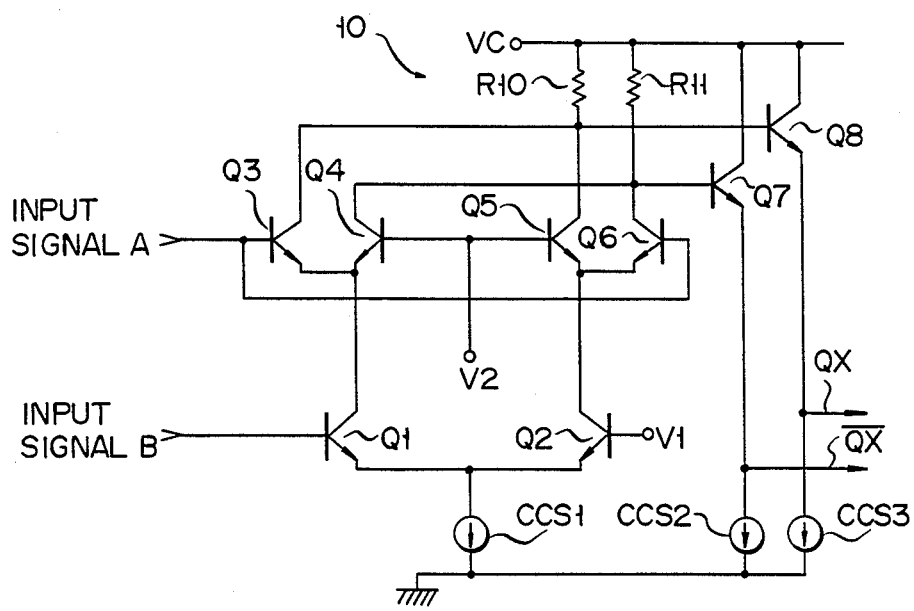
FIG. 3 is a detailed circuit diagram of an exclusive-OR circuit shown in FIG. 2.

FIG. 3 is a detailed circuit diagram of the exclusive-OR circuit 10 shown in FIG. 2. The circuit 10 includes a double balance type differential amplifier circuit having npn transistors Q1 to Q6, load resistors R10 and R11 and a constant current source CCS1, and an output circuit having npn transistors Q7 and Q8 and constant current sources CCS2 and CCS3. In this differential amplifier circuit, the emitters of the transistors Q1 and Q2 are grounded through the current source CCS1, and the emitters of the transistors Q3 and Q4 are commonly connected to the collector of the transistor Q1. The emitters of the transistors Q5 and Q6 are commonly connected to the collector of the transistor Q2. The input signal A is supplied to the bases of the transistors Q3 and Q6, and the input signal B is supplied to the base of the transistor Q1. A voltage V1 having a level between HIGH and LOW levels of the signal B is supplied to the base of the transistor Q2, and a voltage V2 having a level between HIGH and LOW levels of the signal A is supplied to the bases of the transistors Q4 and Q5. However, in this case, a signal B̄ can be supplied to the base of the transistor Q2 and a signal Ā can be supplied to the bases of the transistors Q4 and Q5.

The collectors of the transistors Q3 and Q5 are commonly connected to the base of the transistor Q8, and are commonly connected to a power source terminal VC through the resistor R10. The collectors of the transistors Q4 and Q6 are connected to the base of the transistor Q7, and are commonly connected to tee power source terminal through the resistor R11. The collectors of the transistors Q7 and Q8 are commonly connected to the terminal VC and emitters thereof are grounded through the current sources CCS2 and CCS3. The output signal QX corresponding to the exclusive-OR value of the input signals A and B and an inverted signal $\overline{QX}$ thereof is generated from the emitters of the transistors Q8 and Q7.

For example, when the input signals A and B are respectively at "1" and "0" levels, the transistors Q2 and Q6 are turned on and the transistors Q1 and Q5 are turned off. Thus, the HIGH and LOW level signals are supplied to the bases of the transistors Q7 and Q8, respectively, thereby turning them on and off. Therefore, output signals of "0" and "1" levels are generated from the emitters of the transistors Q7 and Q8, respectively.

Figure 4:
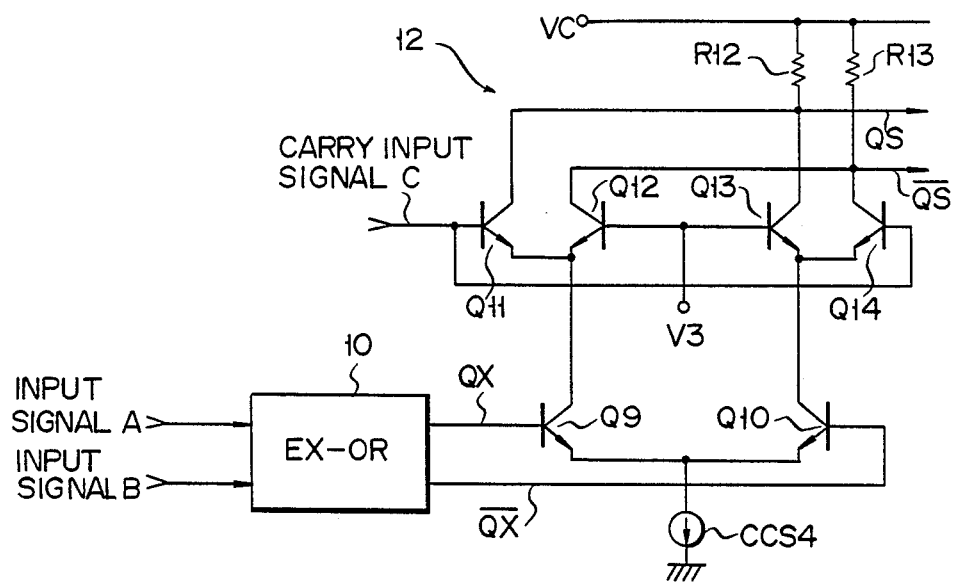
FIG. 4 is a detailed circuit diagram of a sum signal selection circuit shown in FIG. 2.

FIG. 4 shows a detailed circuit diagram of the sum signal selection circuit 12. The circuit 12 includes a double balance type differential amplifier circuit having npn transistors Q9 to Q14, load resistors R12 and R13 and a constant current source CCS4. In this differential amplifier circuit, the emitters of the transistors Q9 and Q10 are grounded through the current source CCS4, and the emitters of the transistors Q11 and Q12 are commonly connected to the collector of the transistor Q9. The emitters of the transistors Q13 and Q14 are commonly connected to the collector of the transistor Q10. The output signals QX and $\overline{QX}$ from the circuit 10 are respectively supplied to the bases of the transistors Q9 and Q10. The carry input signal C is supplied to the bases of the transistors Q11 and Q14, and a voltage V3 having an intermediate level between HIGH and LOW levels of the signal C is applied to the bases of the transistors Q12 and Q13. The signal C can be supplied to the bases of the transistors Q12 and Q13 instead of the voltage V3. The collectors of the transistors Q11 and Q13 are commonly connected to the power source terminal VC through the resistor R12, and the collectors of the transistors Q12 and Q14 are commonly connected to the terminal VC through the resistor R13. The sum signal QS is generated from the collectors of the transistors Q11 and Q13, and the inverted sum signal $\overline{QS}$ is generated from the collectors of the transistors Q12 and Q14.

The circuit 12 generates the sum signal QS in correspondence with the output signals QX and $\overline{QX}$ and the carry input signal C so as to satisfy the relation shown in the above truth table. That is, when the signals QX and C are at "1" and "0" levels, respectively, the "1" level sum signal QS is generated, and in other cases, the "0" level sum signal QS is generated.

Figure 5:
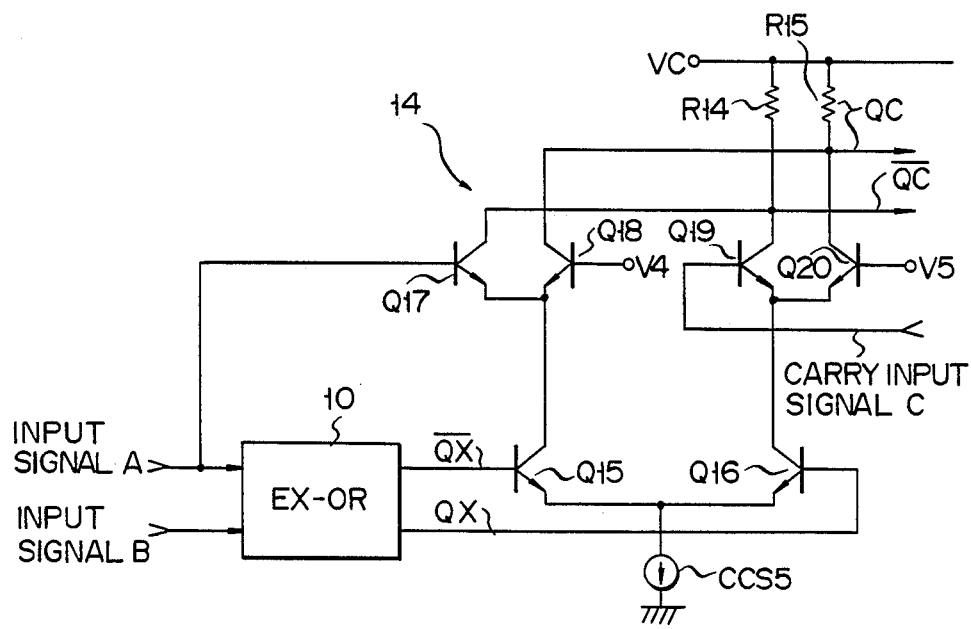
FIG. 5 is a detailed circuit diagram of a carry output signal selection circuit shown in FIG. 2.

FIG. 5 is a detailed circuit diagram of the carry output signal selection circuit 14. The circuit 14 includes a differential amplifier having npn transistors Q15 and Q16, a differential amplifier having npn transistors Q17 and Q18, a differential amplifier having npn transistors Q19 and Q20, a constant current source CCS5 and load resistors R14 and R15. The emitters of the transistors Q15 and Q16 are grounded through the current source CCS5, the emitters of the transistors Q17 and Q18 are commonly connected to the collector of the transistor Q15, and the emitters of the transistors Q19 and Q20 are commonly connected to the collector of the transistor Q16. The collectors of the transistors Q17 and Q19 are commonly connected to the power source terminal VC through the resistor R14, and the collectors of the transistors Q18 and Q20 are commonly connected to the terminal VC through the resistor R15. Furthermore, the output signals QX and $\overline{QX}$ from the circuit 10 are respectively supplied to the bases of the transistors Q16 and Q15, and the input signal A and the carry input signal C are respectively supplied to the bases of the transistors Q17 and Q19. A voltage V4 having an intermediate level between HIGH and LOW levels of the input signal A is applied to the base of the transistor Q18. A voltage V5 having an intermediate level between HIGH and LOW levels of the carry input signal C is applied to the base of the transistor Q20. In this case, the inverted input signal $\overline{A}$ can be supplied to the base of the transistor Q18 instead of the voltage V4, and the inverted carry input signal $\overline{C}$ can be supplied to the base of the transistor Q20 instead of the voltage V5.

The circuit 14 generates the carry output signal QC so as to satisfy the relation shown in the above truth table in response to the output signals QX and $\overline{QX}$ from the circuit 10, the input signal A and the carry input signal C. That is, when the signal QX is at "0" level and the signal A is at "0" level, or when the signal the signal QX is at "1" level and the signal C is at "0" level, the "0" carry output signal QC is generated. In other cases, the "1" carry output signal is generated.

Figure 6:
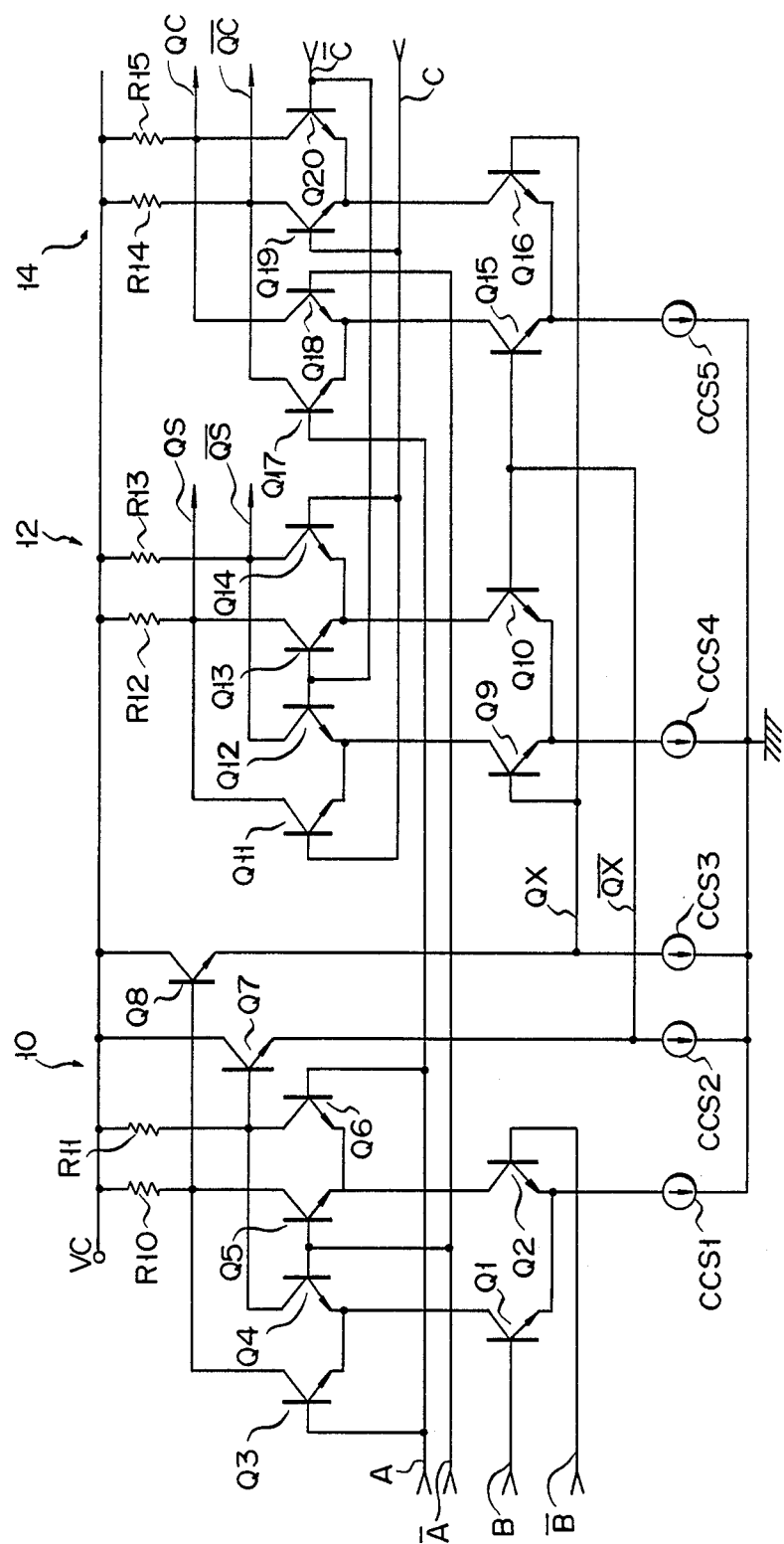
FIG. 6 is a circuit diagram of the logic operation circuit obtained by combining the circuits shown in FIGS. 3 to 5.

FIG. 6 shows a circuit combining the circuits 10, 12 and 14 shown in FIGS. 3 to 5. Note that in FIG. 6, the signals $\overline{B}$; $\overline{A}$; $\overline{C}$; $\overline{A}$ and $\overline{C}$ are respectively supplied to the bases of the transistors Q2; Q4 and Q5; Q12 and Q13; Q18; and Q20.

Assuming that the input signals A and B are at "1" level and the carry input signal C is at "0" level, since the transistors Q1, Q2 and Q6 are turned on, the transistor Q7 is turned on and the transistor Q8 is turned off. Thus, the output signals QX and $\overline{QX}$ of "0" and "1" levels are generated from the circuit 10. In the circuit 12, since the transistors Q10 and Q13 are turned on, the sum signal QS of "0" level is generated therefrom. On the other hand, in the circuit 14, since the transistors Q15 and Q17 are turned on, the carry output signals QC and $\overline{QC}$ of "1" and "0" levels are generated therefrom. In this manner, when the input signals A and B of "1" level and the carry input signal of "0" level are supplied to the logic operation circuit, the circuit generates the sum signal QS of "0" level and the carry output signal QC of "1" level. As shown in the truth table described before, the logic operation circuit can generate the sum input signal QS and the carry output signal QC with respect to various combinations of the input signals A, B and C so as to satisfy the relation shown in the truth table.

Figure 1:
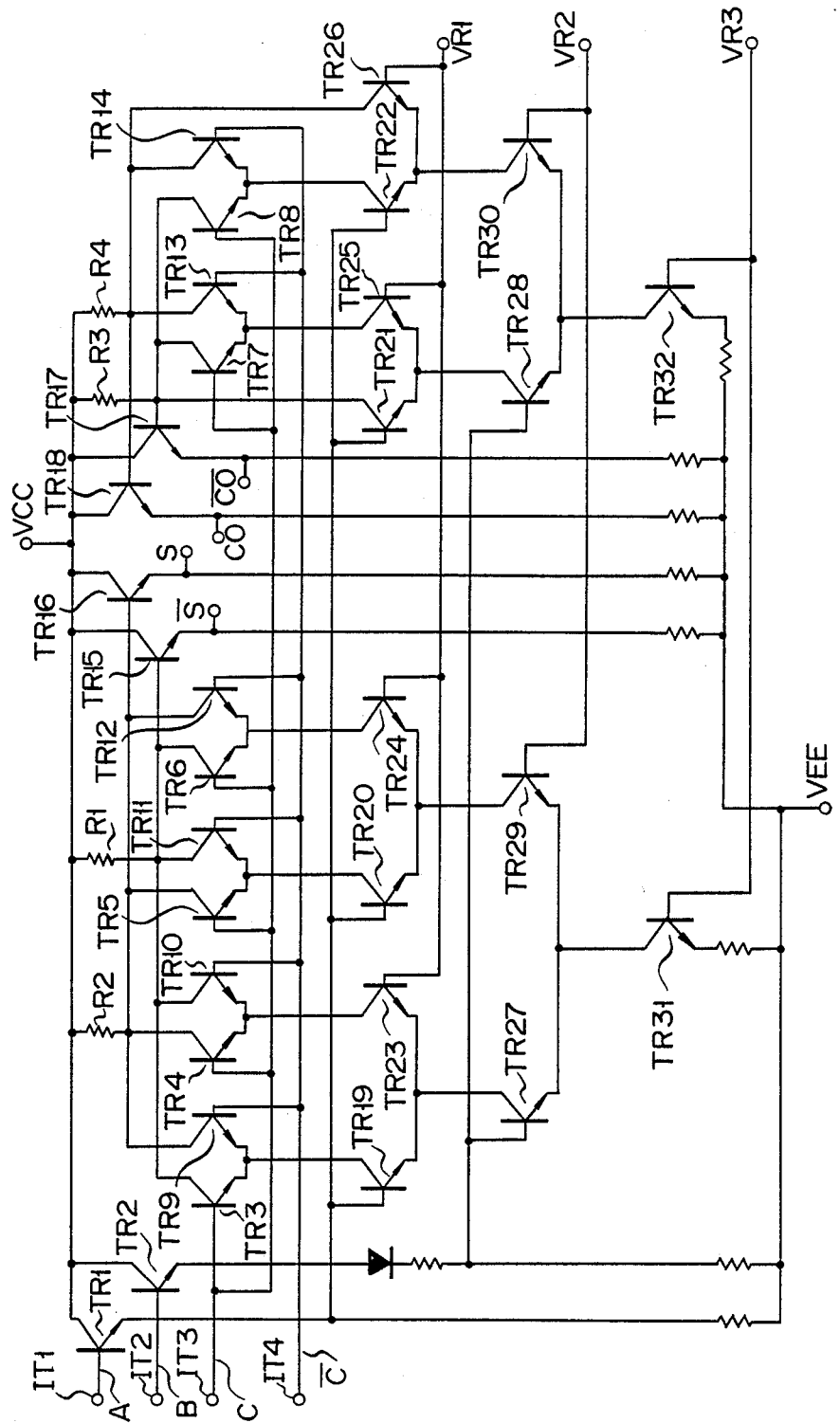
FIG. 1 is a circuit diagram of a conventional full adder circuit.

The logic operation circuit according to the above embodiment comprises the transistors Q1 to Q20, and as compared to the circuit comprising TR1 to TR32 shown in FIG. 1, the number of elements can be greatly decreased and an arrangement thereof is simple. Since the number of the transistors series-connected between the power source terminal VC and ground is small, a drive voltage applied to this power source terminal can be decreased.

What is claimed is:
1. A logic operation circuit comprising:
first and second power source terminals;
an exclusive-OR circuit, constituted by a double balance type differential amplifier circuit connected between said first and second power source terminals and having first and second inputs to receive first and second logical sum signals of preceding steps, for generating an output signal corresponding to an exclusive-OR value of the first and second logical sum signals;

a sum signal selection circuit, constituted by a double balance type differential amplifier connected between the first and second power source terminals and including a lower stage differential amplifier section having first and second current paths selectively activated in accordance with the output signal from said exclusive-OR circuit and an upper stage differential amplifier section having third to sixth current paths selectively activated in accordance with a carry input signal, said third and fourth current paths being connected in series with said first current path and said fifth and sixth current paths being connected in series with said second current path, for generating a sum signal corresponding to the carry input signal when the output signal from said exclusive-OR circuit is a "0" level, and for generating the sum signal corresponding to an inverted carry input signal when the output signals from said exclusive-OR circuit is at "1" level; and a carry output signal selection circuit for generating the first logical sum signal as a carry output signal when the output signal from said exclusive-OR circuit is at "0" level and for generating the carry input signal as the carry output signal when the output signal therefrom is at "1" level, said carry output signal selection circuit including a first differential amplifier having seventh and eighth current paths selectively activated in accordance with the output signal from said exclusive-OR circuit, a second differential amplifier having ninth and tenth current paths selectively activated in accordance with the first logical sum signal and connected in series with said seventh current path, and a third differential amplifier having eleventh and twelfth current paths selectively activated in accordance with the carry input signal and connected in series with said eighth current path.

2. A circuit according to claim 1, wherein said exclusive-OR circuit comprises a differential amplifier having first and second transistors having emitters commonly connected to said second powers source terminal through a first current source and operated in accordance with the second logical sum signal; a differential amplifier including third and fourth transistors whose emitters are commonly connected to the collector of said first transistor and operated in accordance with the first logical sum signal; a differential amplifier having fifth and sixth transistors whose emitters are commonly connected to the collector of said second transistor and operated in accordance with the first logical su signal; first resistor means connected between said first power source terminal and a node between the collectors of said third and fifth transistors; and second resistor means connected between said first power source terminal and a node between the collectors of said fourth and sixth transistors.

3. A circuit according to claim 2, wherein said sum signal selection circuit comprises a differential amplifier including seventh and eighth transistors whose emitters are connected to said second power source terminal through a second current source and operated in accordance with the output signal from said exclusive-OR circuit; a differential amplifier including ninth and tenth transistors whose emitters are commonly connected to the collector of said seventh transistor and operated in accordance with the carry input signal; a differential amplifier including eleventh and twelfth transistors whose emitters are commonly connected to the collector of said eighth transistor and operated in accordance with the carry input signal; third resistor means connected between said first power source terminal and a node between the collectors of said ninth and eleventh transistors; and fourth resistor means connected between said first power source terminal and a node between the collectors of said tenth and twelfth transistors.

4. A circuit according to claim 3, wherein said first differential amplifier of said carry output signal selection circuit includes thirteenth and fourteenth transistors whose emitters are commonly connected to said second power source terminal through a third current source, said second differential amplifier includes fifteenth and sixteenth transistors whose emitters are commonly connected to the collector of said thirteenth transistor, and said third differential amplifier includes seventeenth and eighteenth transistors whose emitters are commonly connected to the collector of said fourteenth transistor, the collectors of said fifteenth and seventeenth transistors being connected to said first power source terminal through fifth resistor means, and the collectors of said sixteenth and eighteenth transistors being connected to said first power source terminal through sixth resistor means.

5. A circuit according to claim 2, wherein said first differential amplifier of said carry output signal selection circuit includes seventh and eighth transistors whose emitters are commonly connected to said second power source terminal through a second current source, said second differential amplifier includes ninth and tenth transistors whose emitters are connected to the collector of said seventh transistor, and said third differential amplifier includes eleventh and twelfth transistors whose emitters are commonly connected to the collector of said eighth transistor, the collectors of said ninth and eleventh transistors being connected to said first power source terminal through fifth resistor means, and the collectors of said tenth and twelfth transistors being connected to said first power source terminal through fourth resistor means.

* * * * *